United States Patent
Hoffmann et al.

[11] Patent Number: 6,060,814
[45] Date of Patent: May 9, 2000

[54] DEVICE AND METHOD FOR DRIVING AT LEAST ONE CAPACITIVE ACTUATOR

[75] Inventors: Christian Hoffmann, Regensburg; Hellmut Freudenberg, Grossberg; Hartmut Gerken, Nittendorf; Martin Hecker, Laimerstadt; Richard Pirkl, Regensburg, all of Germany

[73] Assignee: Siemens Aktiengesellschaft, Munich, Germany

[21] Appl. No.: 09/250,872

[22] Filed: Feb. 16, 1999

Related U.S. Application Data

[63] Continuation of application No. PCT/DE97/01547, Jul. 22, 1997.

[30] Foreign Application Priority Data

Aug. 14, 1996 [DE] Germany ............... 196 32 871

[51] Int. Cl.[7] ................................................. F02D 41/30
[52] U.S. Cl. ................................................. 310/316.03
[58] Field of Search ................................. 310/316.03

[56] References Cited

U.S. PATENT DOCUMENTS

| | | | |
|---|---|---|---|
| 4,404,502 | 9/1983 | Magori et al. | 310/316.03 |
| 4,644,212 | 2/1987 | Moritugu et al. | 310/316.03 |
| 4,688,536 | 8/1987 | Mitsuyasu et al. | 123/490 |
| 4,732,129 | 3/1988 | Takigawa et al. | 310/316.03 |
| 4,947,074 | 8/1990 | Suzuki | 310/316.03 |
| 5,036,263 | 7/1991 | Yamada et al. | 318/116 |
| 5,130,598 | 7/1992 | Verheyen et al. | 310/316.03 |
| 5,208,505 | 5/1993 | Mitsuyasu | 310/317 |
| 5,214,340 | 5/1993 | Suzuki | 310/316.03 |

FOREIGN PATENT DOCUMENTS

| | | | |
|---|---|---|---|
| 0 464 443 A1 | 1/1992 | European Pat. Off. | F02D 41/40 |
| 36 21 541 A1 | 1/1987 | Germany | F02D 41/20 |

*Primary Examiner*—Thomas M. Dougherty
*Attorney, Agent, or Firm*—Herbert L. Lerner; Laurence A. Greenberg

[57] ABSTRACT

A device for driving at least one capacitive actuator contains two capacitors C1 and C2 connected in parallel. The two parallel-connected capacitors C1, C2 are charged to an output voltage $U_{SNT}$ of a voltage source SNT. The actuator is charged with a voltage $U_{C1+C2}=2*U_{SNT}$ by the capacitors, and thereafter discharged into the capacitors, which are again connected in parallel and are subsequently recharged to the output voltage $U_{SNT}$ of the voltage source SNT.

5 Claims, 2 Drawing Sheets

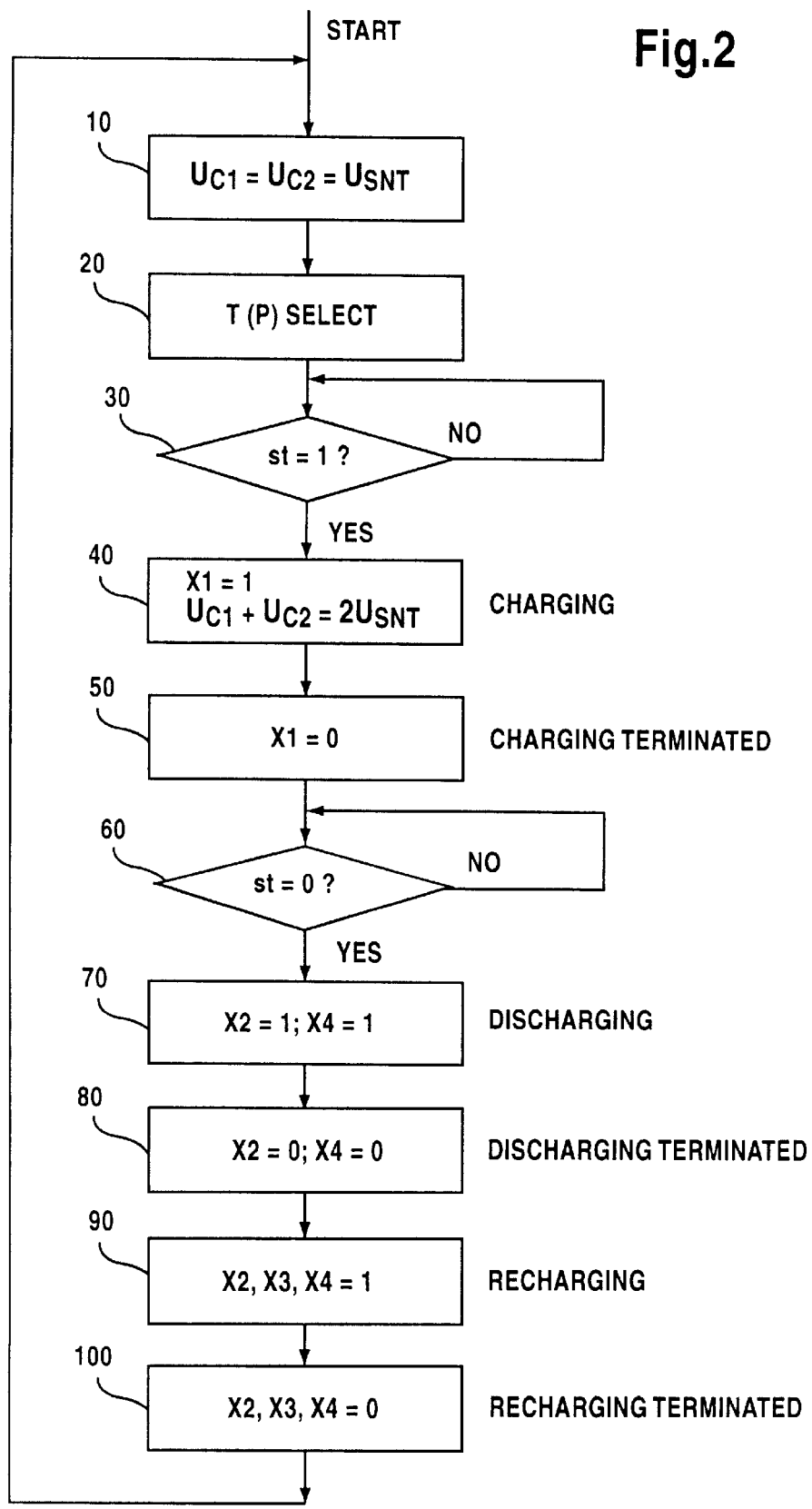

DEVICE AND METHOD FOR DRIVING AT LEAST ONE CAPACITIVE ACTUATOR

CROSS-REFERENCE TO RELATED APPLICATION

This application is a continuation of copending International Aplication No. PCT/DE97/01547, filed Jul. 22, 1997, which designated the United States.

BACKGROUND OF THE INVENTION

Field of the Invention

The invention relates to a device for driving at least one capacitive actuator, in particular a piezoelectrically operated fuel injection valve of an internal combustion engine, by a control circuit. The invention also relates to a method for operating the device.

Published European Patent Application EP 0 464 443 A1 discloses a piezoelectric actuator which is charged from a capacitor via a charging coil. During discharging of the piezoelectric actuator, part of the energy applied is fed back into the capacitor via a discharging coil, while the other part is destroyed by short circuiting, likewise via the discharging coil. During discharging, a negative voltage is present across the piezoelectric actuator. German Patent DE 36 21 541 C2 discloses a driver circuit for a piezoelectric actuator of a fuel injection valve which is charged via a series circuit. The driver circuit is connected to a voltage source and composed of two capacitors and a charging coil, and is discharged into one of the two capacitors via a discharging coil. In an alternative configuration, the actuator is charged via a capacitor, connected to a voltage source, and a charging coil. During discharging, the energy stored in the piezoelectric actuator is destroyed by a discharging coil.

SUMMARY OF THE INVENTION

It is accordingly an object of the invention to provide a device and a method for driving at least one capacitive actuator that overcome the above-mentioned disadvantages of the prior art devices and methods of this general type, which operates as far as possible without losses and is of simple construction, and a method for driving the at least one capacitive actuator, in which the actuator is once again fully discharged and negative voltages across it are avoided.

With the foregoing and other objects in view there is provided, in accordance with the invention, in combination with a control circuit, a device controlled by the control circuit and driving capacitive actuators, including: a first series circuit disposed between a positive pole and a negative pole of a voltage source and conducting current towards the negative pole, the first series circuit including a recharging switch connected to the positive pole, a first discharging switch connected to the recharging switch, a charging switch connected to the first discharging switch and a second discharging switch connected to the charging switch; a first capacitor disposed in parallel with a second series circuit composed of the first discharging switch connected in series with the charging switch; a second capacitor disposed in parallel with a third series circuit composed of the charging switch connected in series with the second discharging switch; a ring-around coil having a first side connected to a node point of the recharging switch and the first discharging switch and a second side to be connected to a first side of an actuator to be driven; a controlled power MOSFET switch having a first side to be connected to a second side of the actuator to be driven and a second side connected to the negative pole; at least one further controlled power MOSFET switch having a first side connected to the negative pole and a second side to be connected to a first side of at least one further actuator to be driven, a second side of the at least one further actuator to be connected to the second side of the ring-around coil; and a diode disposed between the second side of the ring-around coil and the negative pole for conducting current from the negative pole towards the ring-around coil.

With the foregoing and other objects in view there is also provided, in accordance with the invention, a method for operating the above-described device, which includes: switching the first capacitor and the second capacitor in parallel with each other and in parallel with the voltage source for charging the first capacitor and the second capacitor to an output voltage of the voltage source; switching the first capacitor in a series connection with the second capacitor for charging a respective actuator to be driven via the ring-around coil from the first capacitor and the second capacitor; switching the first capacitor in parallel with the second capacitor for discharging the respective actuator via the ring-around coil into the first capacitor and the second capacitor; and subsequently switching the first capacitor in parallel with the second capacitor in parallel with the voltage source for recharging the first capacitor and the second capacitor by the output voltage of the voltage source.

It is particularly advantageous that the voltage source need only be configured for half the charging voltage, and that complete discharging is performed even in the case of a large spread of the actuator capacitances, since each actuator is discharged into the parallel-connected capacitors C1 and C2, whose capacitance can be selected to be four times as large as the actuator capacitance. Charging and discharging each actuator is performed with a complete sinusoidal half-wave of current. As a result, the actuator reaches its operating voltage and thus its final excursion with a "slow" speed (at the maximum value of a cosinusoidal wave). Only frequencies below a fundamental frequency of, in the case of operation of a piezoelectrically operated fuel injection valve, at most 300 Hz are produced in the frequency spectrum, thus scarcely producing EMC problems. Furthermore, the ring-around coil can be displaced from a housing provided for the circuit to be closer to the actuators, since no switch is arranged between it and the actuators.

Other features which are considered as characteristic for the invention are set forth in the appended claims.

Although the invention is illustrated and described herein as embodied in a device and a method for driving at least one capacitive actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a flow chart relating to a mode of operation of the circuit.

DESCRIPTION OF THE PREFERRED EMBODIMENTS

Figure 1:
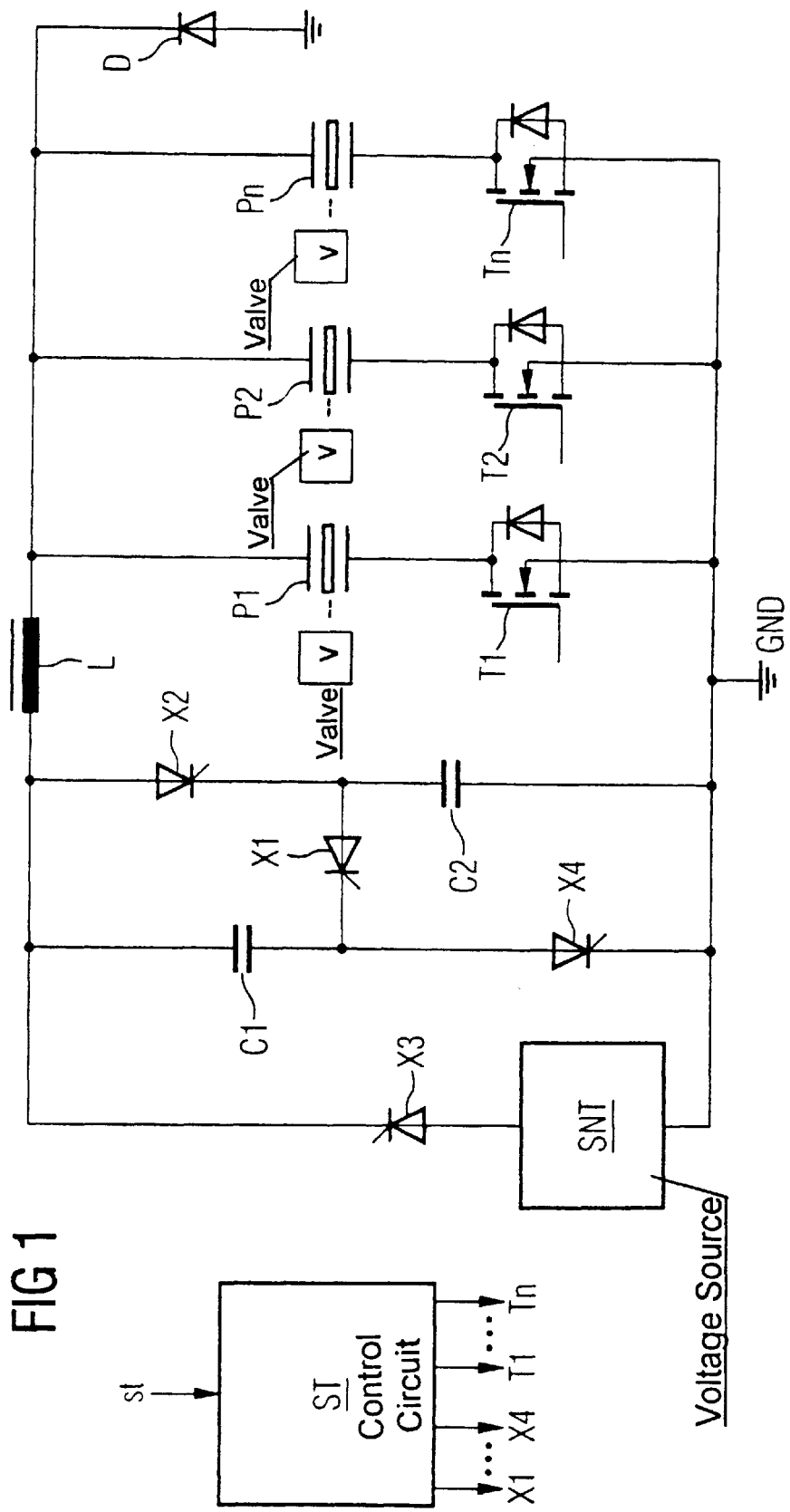
FIG. 1 is a diagrammatic circuit diagram of an exemplary embodiment of a circuit according to the invention.

In all the figures of the drawing, sub-features and integral parts that correspond to one another bear the same reference symbol in each case. Referring now to the figures of the drawing in detail and first, particularly, to FIG. 1 thereof, there is shown a circuit of an exemplary embodiment according to the invention for driving fuel injection valves V of an internal combustion engine via piezoelectric actuators P1 to P$n$ by a control circuit ST. The control circuit ST is part of a microprocessor-controlled engine control device.

Disposed between a positive pole +SNT and a negative pole GND of a voltage source SNT is a series circuit composed of a recharging switch X3, a first discharging switch X2, a charging switch X1 and a second discharging switch X4. The switches X1 to X4 conduct current in a direction of the negative pole GND.

The switches X1 to X4 are electronic switches, preferably thyristor switches, which pass current only in one direction, and include at least one semiconductor element and are controlled to be conducting by the control circuit ST.

Disposed in parallel with the series circuit composed of the first discharging switch X2 and the charging switch X1 is a first capacitor C1. Disposed in parallel with the series circuit composed of the charging switch X1 and the second discharging switch X4 is a second capacitor C2.

From the node point connecting the recharging switch X3 and the first discharging switch X2, a series circuit composed of a ring-around coil L, a first actuator P1 and a first, controlled power MOSFET switch T1 leads to the frame terminal GND.

A series circuit, connected in parallel with the series circuit of the first actuator P1 and the first power MOSFET switch T1 and composed of another actuator P2 to P$n$ and a further power MOSFET switch T2 to T$n$, is provided for each further actuator. A diode D that passes current from the frame terminal GND towards the ring-around coil L is disposed in parallel with all the series circuits composed of the actuators and the power MOSFET switches.

Power MOSFET switches normally contain inverse diodes, the function of which is used, as explained in more detail further below, when operating the device according to the invention. The switches X1 to X4 and T1 to T$n$ are controlled by the control circuit ST as a function of control signals st of the engine control device.

A method for operating the described device is explained in more detail below with the aid of FIG. 2.

Starting from a state in which each of the two capacitors C1 and C2 are charged to the output voltage $U_{SNT}$ of the voltage source SNT, the ring-around coil L is de-energized, all the switches X1 to X4 and T1 to T$n$ are non-conducting (of high resistance) and all the actuators P1 to P$n$ are discharged in step 10, for operating the actuator P1 in order to inject fuel into a cylinder via the assigned injection valve.

As the next step, the control circuit selects the appropriate actuator, step 20, by controlling the power MOSFET switch T1 assigned to it to be conducting at least for the duration of one charging operation. However, T1 can also remain conducting (of low resistance) over a crankshaft angle CS=720° CS/N (N=number of cylinders), which is, for example, 180° CS for four-cylinder engines and 120° CS for six-cylinder engines.

At the start of injection, which is prescribed at step 30 by the beginning of a control signal st, the control circuit ST triggers in a step 40 the charging switch X1, as a result of which the two capacitors C1 and C2 are connected in series. Consequently, the voltage $U_{C1+C2}=2*U_{SNT}$ present across the capacitors C1+C2 is discharged during a complete sinusoidal half-wave via the ring-around coil L into the actuator P1, and the latter opens the injection valve V.

After the ring-around, the charging switch X1 at step 50 is non-conducting; the actuator P1 remains charged. A residual voltage dependent on the capacitance remains across the capacitors C1 and C2.

To discharge the actuator at the end (completion) of the control signal st at step 60, the two discharging switches X2 and X4 are triggered at step 70. The result for the two capacitors C1 and C2 is a parallel circuit into which the actuator P1 is discharged. The discharging circuit is closed via the inverse diode of the power MOSFET switch T1. The energy stored in the actuator P1 swings back via the ring-around coil L into the two parallel-connected capacitors C1 and C2 which, because of the losses occurring, are charged to a voltage $U<U_{SNT}$ and can be used for the following cycle. The parallel connection of the capacitors C1 and C2 (enlargement of the capacitance) during the discharging of the actuator reliably discharges the latter despite the residual voltage (of +10 V, for example) which has remained.

As soon as the actuator has been discharged to the threshold voltage of the parallel-connected diode D, the current still flowing is continued via the diode D, thus preventing charging of the actuator to a negative voltage. Subsequently, the two discharging switches X2 and X4 are non-conducting at step 80.

For the charging cycle of the next actuator, it is first necessary to compensate for the losses that have occurred. For this purpose, the two discharging switches X2 and X4 are retriggered and, in addition, the recharging switch X3 is triggered, as a result of which the capacitors C1 and C2, which are now again connected in parallel with one another, are charged to the output voltage $U_{SNT}$ of the voltage source SNT. Subsequently, the switches X2, X3 and X4 are put in a non-conducting state, and it is possible to select the next actuator and repeat the method for this actuator from the start.

We claim:

1. In combination with a control circuit, a device controlled by the control circuit and driving capacitive actuators, comprising:

a first series circuit disposed between a positive pole and a negative pole of a voltage source and conducting current towards the negative pole, said first series circuit including a recharging switch connected to the positive pole, a first discharging switch connected to said recharging switch, a charging switch connected to said first discharging switch and a second discharging switch connected to said charging switch;

a first capacitor disposed in parallel with a second series circuit composed of said first discharging switch connected in series with said charging switch;

a second capacitor disposed in parallel with a third series circuit composed of said charging switch connected in series with said second discharging switch;

a ring-around coil having a first side connected to a node point of said recharging switch and said first discharging switch and a second side to be connected to a first side of an actuator to be driven;

a controlled power MOSFET switch having a first side to be connected to a second side of the actuator to be driven and a second side connected to the negative pole;

at least one further controlled power MOSFET switch having a first side connected to the negative pole and a second side to be connected to a first side of at least one further actuator to be driven, a second side of the at least one further actuator to be connected to said second side of said ring-around coil; and a diode disposed between said second side of said ring-around coil and the negative pole for conducting current from the negative pole towards said ring-around coil.

2. The device according to claim 1, wherein the control circuit is a part of a microprocessor-controlled engine control device.

3. The device according to claim 1, wherein said charging switch, said discharging switch and said recharging switch are controlled, electronic switches passing current only in one direction and have at least one semiconductor element.

4. In combination with a control circuit, a device controlled by the control circuit and driving a piezoelectrically operated fuel injection valve of an internal combustion engine, comprising:

a first series circuit disposed between a positive pole and a negative pole of a voltage source and conducting current towards the negative pole, said first series circuit including a recharging switch connected to the positive pole, a first discharging switch connected to said recharging switch, a charging switch connected to said first discharging switch and a second discharging switch connected to said charging switch;

a first capacitor disposed in parallel with a second series circuit containing said first discharging switch connected in series with said charging switch;

a second capacitor disposed in parallel with a third series circuit containing said charging switch connected in series with said second discharging switch;

a fourth series circuit disposed between a node point of said recharging switch and said first discharging switch and the negative pole, said fourth series circuit including a ring-around coil, an actuator connected to said ring-around coil for driving a valve, and a controlled power MOSFET switch connected to said actuator, said controlled power MOSFET switch connected in series with said actuator defining a fifth series circuit;

a sixth series circuit connected in parallel with said fifth series circuit, said sixth series circuit including at least one further controlled power MOSFET switch and at least one further actuator connected in series with said at least one further controlled power MOSFET switch; and a diode connected between the negative pole and said ring-around coil for conducting current from the negative pole towards said ring-around coil.

5. A method for operating the device according to claim 1, which comprises:

switching the first capacitor and the second capacitor in parallel with each other and in parallel with the voltage source for charging the first capacitor and the second capacitor to an output voltage of the voltage source;

switching the first capacitor in a series connection with the second capacitor for charging a respective actuator to be driven via the ring-around coil from the first capacitor and the second capacitor;

switching the first capacitor in parallel with the second capacitor for discharging the respective actuator via the ring-around coil into the first capacitor and the second capacitor; and subsequently switching the first capacitor in parallel with the second capacitor in parallel with the voltage source for recharging the first capacitor and the second capacitor by the output voltage of the voltage source.

* * * * *